US011506100B2

(12) United States Patent
Rockey et al.

(10) Patent No.: US 11,506,100 B2
(45) Date of Patent: Nov. 22, 2022

(54) DIESEL EXHAUST FLUID TANK HEATING SYSTEM

(71) Applicant: Cummins Power Generation Inc., Minneapolis, MN (US)

(72) Inventors: Shawn Aaron Rockey, Seymour, IN (US); Lorraine H. Myers, Minnetonka, MN (US); Matthew Richard Hudson, Stillwater, MN (US); Kyle David Richart, Indianapolis, IN (US); Corey James Fletcher, Seymour, IN (US); Daniel Joseph Motz, Minneapolis, MN (US)

(73) Assignee: Cummins Power Generation Inc., Minneapolis, MN (US)

( * ) Notice: Subject to any disclaimer, the term of this patent is extended or adjusted under 35 U.S.C. 154(b) by 0 days.

(21) Appl. No.: 17/508,223

(22) Filed: Oct. 22, 2021

(65) Prior Publication Data

US 2022/0127988 A1     Apr. 28, 2022

Related U.S. Application Data

(60) Provisional application No. 63/104,848, filed on Oct. 23, 2020.

(51) Int. Cl.
*F01N 3/00*     (2006.01)
*F01N 3/20*     (2006.01)

(52) U.S. Cl.
CPC ........ *F01N 3/208* (2013.01); *F01N 2610/105* (2013.01); *F01N 2610/144* (2013.01);
(Continued)

(58) Field of Classification Search
CPC ............... F01N 3/208; F01N 2610/105; F01N 2610/1406; F01N 2610/148;
(Continued)

(56) References Cited

U.S. PATENT DOCUMENTS 6,063,350 A *  5/2000  Tarabulski ......... B01D 53/9495
                                                          423/239.1
2007/0163240 A1  7/2007  Nishina et al.
(Continued)

FOREIGN PATENT DOCUMENTS

DE   10 2009 047 159 A1   6/2011
DE   10 2009 060 288 A1   6/2011
(Continued)

OTHER PUBLICATIONS

Int'l Search Report in PCT/US2021/056189 dated Jan. 24, 2022 (12 pgs).

*Primary Examiner* — Matthew T Largi
(74) *Attorney, Agent, or Firm* — Foley & Lardner LLP (57) ABSTRACT

Systems and apparatuses include a diesel exhaust fluid tank, a first temperature sensor positioned within the diesel exhaust fluid tank and structured to provide first temperature information indicative of a first temperature, and a second temperature sensor positioned within the diesel exhaust fluid tank and structured to provide second temperature information indicative of a second temperature. The systems and apparatuses further include one or more processing circuits including one or more memory devices coupled to one or more processors, the one or more memory devices configured to store instructions thereon that, when executed by the one or more processors, cause the one or more processors to provide energy to a heating system based on the first temperature information and the second temperature information.

18 Claims, 7 Drawing Sheets

(52) U.S. Cl.
CPC *F01N 2610/1406* (2013.01); *F01N 2610/148* (2013.01); *F01N 2610/1486* (2013.01); *F01N 2900/1811* (2013.01); *F01N 2900/1814* (2013.01); *F01N 2900/1818* (2013.01)

(58) Field of Classification Search
CPC ..... F01N 2610/1486; F01N 2900/1811; F01N 2900/1814; F01N 2900/1818
See application file for complete search history.

(56) References Cited

U.S. PATENT DOCUMENTS

| | | | | |
|---|---|---|---|---|
| 2010/0200107 | A1* | 8/2010 | Weathers | B67D 7/38 141/82 |
| 2013/0263938 | A1* | 10/2013 | Harr | B01D 35/26 137/334 |
| 2013/0340409 | A1* | 12/2013 | Hodgson | F01N 3/08 60/285 |
| 2014/0334983 | A1* | 11/2014 | Yang | G01F 23/296 422/119 |
| 2015/0016485 | A1* | 1/2015 | David | G01K 13/00 374/16 |
| 2016/0186633 | A1* | 6/2016 | Müller | B60K 13/04 29/611 |
| 2017/0044949 | A1* | 2/2017 | Khaled | F01N 3/208 |
| 2017/0159523 | A1 | 6/2017 | Borsoi et al. | |
| 2017/0191434 | A1* | 7/2017 | Treudt | F02D 41/26 |
| 2019/0186978 | A1* | 6/2019 | Rondano | G01F 23/265 |

FOREIGN PATENT DOCUMENTS

| | | |
|---|---|---|
| EP | 2 147 198 B1 | 10/2011 |
| JP | 2012241547 A * | 12/2012 |

\* cited by examiner

DIESEL EXHAUST FLUID TANK HEATING SYSTEM

CROSS REFERENCE TO RELATED APPLICATIONS

This application claims the benefit of and priority to U.S. Provisional Patent Application No. 63/104,848, filed Oct. 23, 2020, the entire contents of which are incorporated herein by reference.

TECHNICAL FIELD

The present disclosure relates to engine exhaust aftertreatment systems. More particularly, the present disclosure relates to systems and methods for diesel exhaust fluid (DEF) management in a selective catalytic reduction (SCR) aftertreatment system.

BACKGROUND

SCR aftertreatment systems consume diesel exhaust fluid (DEF). DEF typically includes 32.5% urea and 67.5% deionized water. Typically, DEF freezes at minus twelve degrees Celsius (−12° C.) or eleven degrees Fahrenheit (11° F.).

SUMMARY

One embodiment relates to a diesel exhaust fluid system that includes a diesel exhaust fluid tank, a first temperature sensor positioned within the diesel exhaust fluid tank and structured to provide first temperature information indicative of a first temperature, a second temperature sensor positioned within the diesel exhaust fluid tank and structured to provide second temperature information indicative of a second temperature, and one or more processing circuits comprising one or more memory devices coupled to one or more processors, the one or more memory devices configured to store instructions thereon that, when executed by the one or more processors, cause the one or more processors to provide energy to a heating system based on the first temperature information and the second temperature information.

Another embodiment relates to a diesel exhaust fluid tank control system for use with a diesel exhaust fluid tank including a temperature ultrasonic level and concentration (TULC) sensor and a heating system. The diesel exhaust fluid tank control system includes a temperature sensor array positioned within the diesel exhaust fluid tank and structured to provide temperature information, and one or more processing circuits comprising one or more memory devices coupled to one or more processors, the one or more memory devices configured to store instructions thereon that, when executed by the one or more processors, cause the one or more processors to provide energy to the heating system based on the temperature information.

Another embodiment relates to a method that includes receiving primary temperature information indicative of a primary temperature from a first temperature sensor positioned within a diesel exhaust fluid tank, receiving secondary temperature information indicative of a secondary temperature from a temperature sensor array positioned within the diesel exhaust fluid tank, and selectively providing energy to a heating system positioned within the diesel exhaust fluid tank based on the primary temperature and the secondary temperature.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Following below are more detailed descriptions of various concepts related to, and implementations of, methods, apparatuses, and systems for thawing a diesel exhaust fluid (DEF) tank. Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

Typical diesel exhaust fluid (DEF) freeze prevention systems utilize a temperature ultrasonic level and concentration (TULC) sensor including a singular temperature sensor located inside a DEF tank or vessel. The TULC sensor provides localized thaw performance because temperature is only measured in a single location within the DEF tank and in some situations is not indicative of a uniform temperature throughout the entire body of DEF within the DEF tank. For example, off highway vehicles, such as mining trucks, may have large engines (e.g., over 700 horsepower) and DEF tanks larger than 30, 60, 100 and 200 gallons. In large DEF tanks, the localized temperature measured by the TULC sensor in not always indicative of DEF temperature throughout the DEF tank, especially in low temperatures (e.g., zero degrees Fahrenheit). As noted earlier, typically, DEF freezes at minus twelve degrees Celsius (−12° C.) or eleven degrees Fahrenheit (11° F.).

In typical systems, the temperature signal from the TULC sensor is used to trigger heat sources applied to the DEF tank and other emissions related components. Accurate readings are important to ensure that emissions requirements are met.

Referring to the figures generally, the various embodiments disclosed herein relate to systems, apparatuses, and methods for improved thawing of a DEF tank. A DEF heating or thawing system includes a controller (e.g., an engine control module or a dedicated controller) that controls an electronically controlled coolant valve that selectively provides heated coolant from an engine to a heat exchanger positioned within the DEF tank to heat or thaw the DEF within the tank when the temperature of DEF within the DEF tank is equal to or less than a predetermined temperature (e.g., fifteen degree Celsius). The controller receives temperature information from a TULC sensor located adjacent to the heat exchanger, and a secondary temperature sensor array that includes one or more temperature sensors spaced apart from the TULC sensor within the DEF tank. The secondary temperature sensor array coordinated with the TULC sensor create a temperature matrix is used to post process all temperature signals and provide a more accurate heating strategy and/or control of the DEF heating system. The temperature matrix can be created using a preprogrammed model, algorithm, logic, or a machine learning scheme to provide a more accurate thermal model of DEF within the DEF tank and therefore provide a more accurate control of the electronically controlled coolant valve to more successfully maintain temperature or thaw DEF within the DEF tank. The improved DEF heating system provides advantages including elimination of hot spots near the TULC sensor which can lead to premature shut off of coolant flow to the heat exchanger thereby allowing some DEF within the DEF tank to remain frozen. Another advantage of the more accurate thermal model is the elimination of false indications of the amount of thawed DEF that is ready for injection. The thermal model allows an aftertreatment system to successfully begin dosing sooner.

Figure 1:
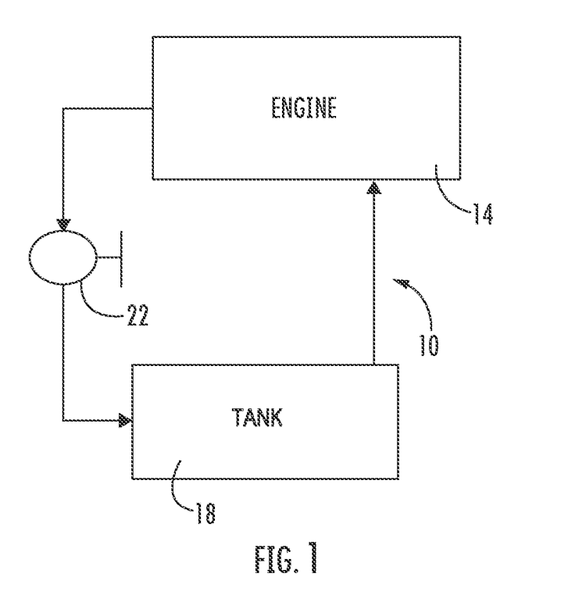
FIG. 1 is a schematic diagram of a DEF heating system according to some embodiments.

As shown in FIG. 1, a diesel exhaust fluid system in the form of a DEF heating system 10 includes an engine 14, a DEF tank 18, and a switching element in the form of an electronically controlled coolant valve 22 that controls a flow of energy to the DEF tank 18 to heat DEF held within the DEF tank 18. In some embodiments, the switching element includes an electronic switch, a mechanically operated valve, or other switching devices. In some embodiments, the energy that heats the DEF tank 18 is provided by a generator, a battery, an auxiliary heating system, or another heat source other than the engine 14. In general, the engine 14 produces heat that is absorbed by a coolant. The electronically controlled coolant valve 22 controls a flow of coolant to the DEF tank 18 to heat the DEF tank.

Figure 2:
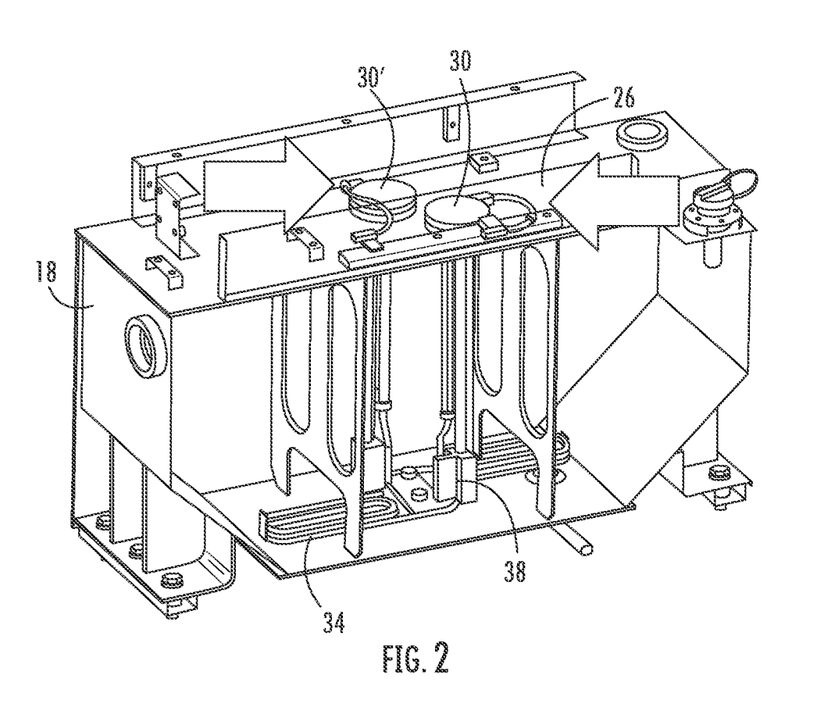
FIG. 2 is a cross sectional view of a DEF tank according to some embodiments.

As shown in FIG. 2, the DEF tank 18 includes a header 26 structured to seal the DEF tank 18 and support filters, suction and filling tubes for DEF, and a heating unit 30 that includes a heating element in the form of a heat exchanger 34 and a TULC sensor 38. In some embodiments, the heating element is a submersible resistive heating element, or another heating element, as desired. The header 26 includes two heating units 30, 30' that are substantially identical. In some embodiments, more than two or less than two heating units 30 are included in the header 26. The heat exchanger 34 is fluidly coupled to the electronically controlled coolant valve 22 and selectively receives coolant heated by the engine 14. The heat exchanger 34 exchanges heat between the DEF held in the DEF tank 18 and the coolant heated by the engine 14.

Figure 3:
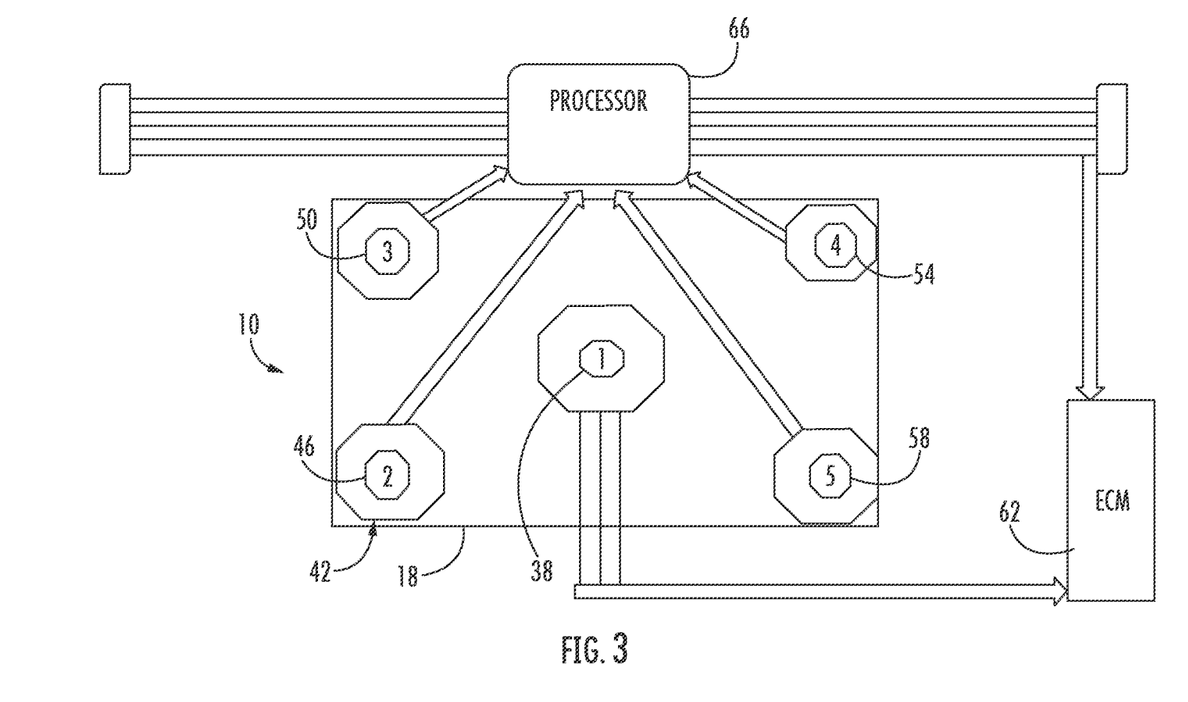
FIG. 3 is a schematic view of a DEF heating system according to some embodiments.

As shown in FIG. 3, the TULC sensor 38 is centrally located within the DEF tank 18. The DEF heating system 10 also includes a secondary sensor array 42 including a first temperature sensor 46, a second temperature sensor 50, a third temperature sensor 54, and a fourth temperature sensor 58. In some embodiments, the TULC sensor 38 includes a sensor suite including a level sensor, a quality sensor, and the first temperature sensor. In some embodiments, the secondary sensor array 42 includes more than four temperature sensors or less than four temperature sensors. For example, in a thirty gallon DEF tank, one temperature sensor may be sufficient within the secondary sensor array 42 while a one-hundred gallon DEF tank may require five temperature sensors within the secondary sensor array 42. The secondary sensor array 42 is positioned to sense temperature of the DEF within the DEF tank 18 at positions that are remote from the TULC sensor 38. For example, corners of a large DEF tank 18 may receive less thermal circulation and therefore not heat evenly with the bulk of the DEF within the DEF tank 18. The secondary sensor array 42 can position a temperature sensor in the remote corner to provide a temperature in the corner. As shown in FIG. 3, the four temperature sensors 46, 50, 54, 58 are positioned in the four corners of a generally rectangularly shaped DEF tank 18.

The TULC sensor 38 is communicably coupled to an engine control module (ECM) 62 associated with the engine 14. The secondary sensor array 42 is coupled to a diesel exhaust fluid tank control system in the form of a controller 66 that communicates with the ECM 62. In some embodiments, the controller 66 is mounted on the engine 14. In some embodiments, the controller 66 is mounted remote from the engine 14. The ECM 62 and the controller 66 coordinate and develop a thermal model of the DEF tank 18. In some embodiments, the controller 66 is embodied as a module or circuit within the ECM 62. In some embodiments, the controller 66 is a separate controller located remotely from the ECM 62. In some embodiments, aspects of the ECM 62 and the controller 66 are shared, distributed, or incorporated in a cloud based control scheme.

Figure 4:
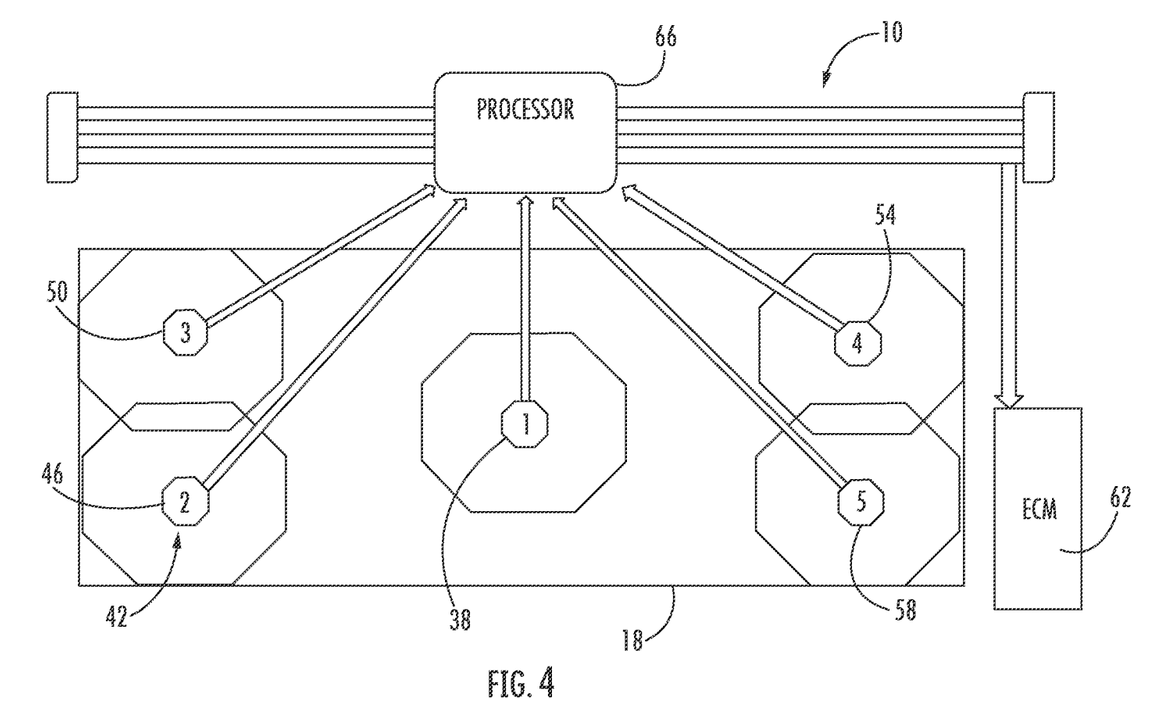
FIG. 4 is a schematic view of a DEF heating system according to some embodiments.

As shown in FIG. 4, the TULC sensor 38 and the secondary sensor array 42 can communicate with the controller 66 directly, and the controller 66 can communicate with the ECM 62 to enact control of the electronically controlled coolant valve 22. In some embodiments, the controller 66 communicates directly with the electronically controlled coolant valve 22 without intervention of the ECM 62.

As the components of FIG. 1 are shown to be embodied in a vehicle including the DEF heating system 10, the controller 66 may be structured as one or more electronic control units (ECU). The controller 66 may be separate from or included with at least one of a transmission control unit, an exhaust aftertreatment control unit, a powertrain control module, an engine control module (e.g., the ECM 62), etc. The function and structure of the controller 66 is described in greater detail in FIG. 5.

Figure 5:
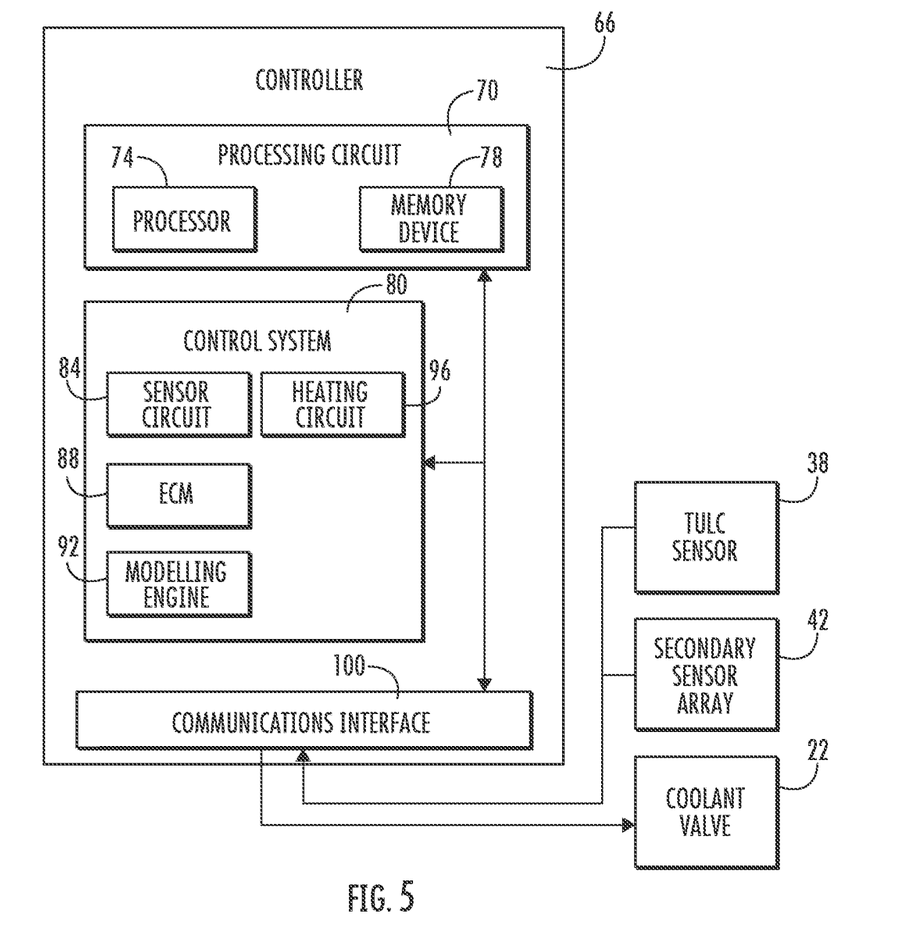
FIG. 5 is a schematic view of a controller for a DEF heating system according to some embodiments.

Referring now to FIG. 5, a schematic diagram of the controller 66 of the DEF heating system 10 of FIG. 1 is shown according to an example embodiment. As shown in FIG. 5, the controller 66 includes a processing circuit 70 having a processor 74 and a memory device 78, a control system 80 having a sensor circuit 84, an ECM circuit 88, a modelling engine 92, and a heating circuit 96, and a communications interface 100. Generally, the controller 66 is structured to generate a thermal model of the DEF tank 18 and control operation of the electronically controlled coolant valve 22.

In one configuration, the sensor circuit 84, the ECM circuit 88, the modelling engine 92, and the heating circuit 96 are embodied as machine or computer-readable media that is executable by a processor, such as processor 74. As described herein and amongst other uses, the machine-readable media facilitates performance of certain operations to enable reception and transmission of data. For example, the machine-readable media may provide an instruction (e.g., command, etc.) to, e.g., acquire data. In this regard, the machine-readable media may include programmable logic that defines the frequency of acquisition of the data (or, transmission of the data). The computer readable media may include code, which may be written in any programming language including, but not limited to, Java or the like and any conventional procedural programming languages, such as the "C" programming language or similar programming languages. The computer readable program code may be executed on one processor or multiple remote processors. In the latter scenario, the remote processors may be connected to each other through any type of network (e.g., CAN bus, etc.).

In another configuration, the sensor circuit 84, the ECM circuit 88, the modelling engine 92, and the heating circuit 96 are embodied as hardware units, such as electronic control units. As such, the sensor circuit 84, the ECM circuit 88, the modelling engine 92, and the heating circuit 96 may be embodied as one or more circuitry components including, but not limited to, processing circuitry, network interfaces, peripheral devices, input devices, output devices, sensors, etc. In some embodiments, the sensor circuit 84, the ECM circuit 88, the modelling engine 92, and the heating circuit 96 may take the form of one or more analog circuits, electronic circuits (e.g., integrated circuits (IC), discrete circuits, system on a chip (SOCs) circuits, microcontrollers, etc.), telecommunication circuits, hybrid circuits, and any other type of "circuit." In this regard, the sensor circuit 84, the ECM circuit 88, the modelling engine 92, and the heating circuit 96 may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on). The sensor circuit 84, the ECM circuit 88, the modelling engine 92, and the heating circuit 96 may also include programmable hardware devices such as field programmable gate arrays, programmable array logic, programmable logic devices or the like. The sensor circuit 84, the ECM circuit 88, the modelling engine 92, and the heating circuit 96 may include one or more memory devices for storing instructions that are executable by the processor(s) of the sensor circuit 84, the ECM circuit 88, the modelling engine 92, and the heating circuit 96. The one or more memory devices and processor(s) may have the same definition as provided below with respect to the memory device 78 and processor 74. In some hardware unit configurations, the sensor circuit 84, the ECM circuit 88, the modelling engine 92, and the heating circuit 96 may be geographically dispersed throughout separate locations in the vehicle. Alternatively and as shown, the sensor circuit 84, the ECM circuit 88, the modelling engine 92, and the heating circuit 96 may be embodied in or within a single unit/housing, which is shown as the controller 66.

In the example shown, the controller 66 includes the processing circuit 70 having the processor 74 and the memory device 78. The processing circuit 70 may be structured or configured to execute or implement the instructions, commands, and/or control processes described herein with respect to the sensor circuit 84, the ECM circuit 88, the modelling engine 92, and the heating circuit 96. The depicted configuration represents the sensor circuit 84, the ECM circuit 88, the modelling engine 92, and the heating circuit 96 as machine or computer-readable media. However, as mentioned above, this illustration is not meant to be limiting as the present disclosure contemplates other embodiments where the sensor circuit 84, the ECM circuit 88, the modelling engine 92, and the heating circuit 96, or at least one circuit of the sensor circuit 84, the ECM circuit 88, the modelling engine 92, and the heating circuit 96, is configured as a hardware unit. All such combinations and variations are intended to fall within the scope of the present disclosure.

The hardware and data processing components used to implement the various processes, operations, illustrative logics, logical blocks, modules and circuits described in connection with the embodiments disclosed herein (e.g., the processor 74) may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, or state machine. A processor also may be implemented as a combination of computing devices, such as a combination of a DSP and a microprocessor, a plurality of microprocessors, one or more microprocessors in conjunction with a DSP core, or any other such configuration. In some embodiments, the one or more processors may be shared by multiple circuits (e.g., the sensor circuit 84, the ECM circuit 88, the modelling engine 92, and the heating circuit 96 may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. All such variations are intended to fall within the scope of the present disclosure.

The memory device 78 (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory device 78 may be communicably connected to the processor 74 to provide computer code or instructions to the processor 74 for executing at least some of the processes described herein. Moreover, the memory device 78 may be or include tangible, non-transient volatile memory or non-volatile memory. Accordingly, the memory device 78 may include database components, object code components, script components, or any other type of information structure for supporting the various activities and information structures described herein.

The sensor circuit 84 is structured to collect temperature information from the TULC sensor 38 and the secondary sensor array 42 via the communications interface 100. In some embodiments, the sensor circuit 84 manipulates the information provided by the TULC sensor 38 and the secondary sensor array 42 for use by the controller 66. For example, the sensor circuit 84 may average the temperature information of the individual sensors (e.g., the temperature sensors 46, 50, 54, 58), process them with a weighted average, or perform other processing.

The ECM circuit 88 is structured to communicate with the ECM 62 to coordinate actions therewith. In some embodiments, the ECM circuit 88 is the ECM 62. In some embodiments, the ECM circuit 88 controls operation of the electronically controlled coolant valve 22 by providing communication with the ECM 62 via the communications interface 100. In some embodiments, the sensor circuit 84 is not directly in communication with the TULC sensor 38 and the temperature information from the TULC sensor 38 is received by the ECM circuit 88.

The modelling engine 92 is structured to generate thermal model of the DEF tank 18 based on the temperature information received from the sensor circuit 84 and the ECM circuit 88. In some embodiments, the thermal model include a machine learning scheme (reinforcement learning, neural network, etc.) that learns the relationships between the TULC sensor 38 and the secondary sensor array to generate a three-dimensional heat map of the DEF tank 18 and determine where in the DEF tank 18 the DEF is above a predetermined threshold temperature and where in the DEF tank 18 the DEF is below the threshold temperature. In some embodiments, the thermal model is based on a preprogrammed model, an algorithm, ladder logic, etc.

In some embodiments, the temperature indicated by the TULC sensor 38 is a primary temperature T1, and the temperature indicated by the secondary sensor array 42 is a secondary temperature T2. In some embodiments, each individual sensor in the secondary sensor array 42 is assigned a temperature (e.g., T2-T5). The modelling engine 92 then compares the primary temperature T1 and the secondary temperature T2 or all the secondary temperatures T2-T5 and returns the lowest temperature for use by the controller 66. For example, if the secondary temperature T2 is less than the primary temperature T1, then the thermal model returns the secondary temperature. In some embodiments, the temperatures T1-T5 are assigned weighted averages, such that the sensors are given a priority. For example, the primary temperature T1 determined by the TULC sensor 38 may be the highest priority temperature. The modelling engine 92 may assign a predetermined range wherein the primary temperature is returned. For example, if the threshold temperature is fifteen degrees Celsius (15° C.), and the range is one degree Celsius (1° C.), then the secondary temperature is returned when the secondary temperature is equal to or less than fourteen degrees Celsius (14° C.).

The heating circuit 96 receives the thermal model and communicates with the electronically controlled coolant valve 22 to actuate the electronically controlled coolant valve 22 between an open position where coolant is provided to the heat exchanger 34 and a closed position where coolant is inhibited from flowing to the heat exchanger 34. In some embodiments, the electronically controlled coolant valve 22 is closed when the thermal model indicates that the temperature of DEF within the DEF tank 18 is equal to or above the threshold temperature (e.g., 15° C.) and opened when the thermal model indicates that the temperature of DEF within the DEF tank 18 is below the threshold temperature (e.g., 15° C.). In some embodiments, the heating circuit 96 communicates with the ECM 62 via the communications interface 100 to enact control of the electronically controlled coolant valve 22.

Figure 6:
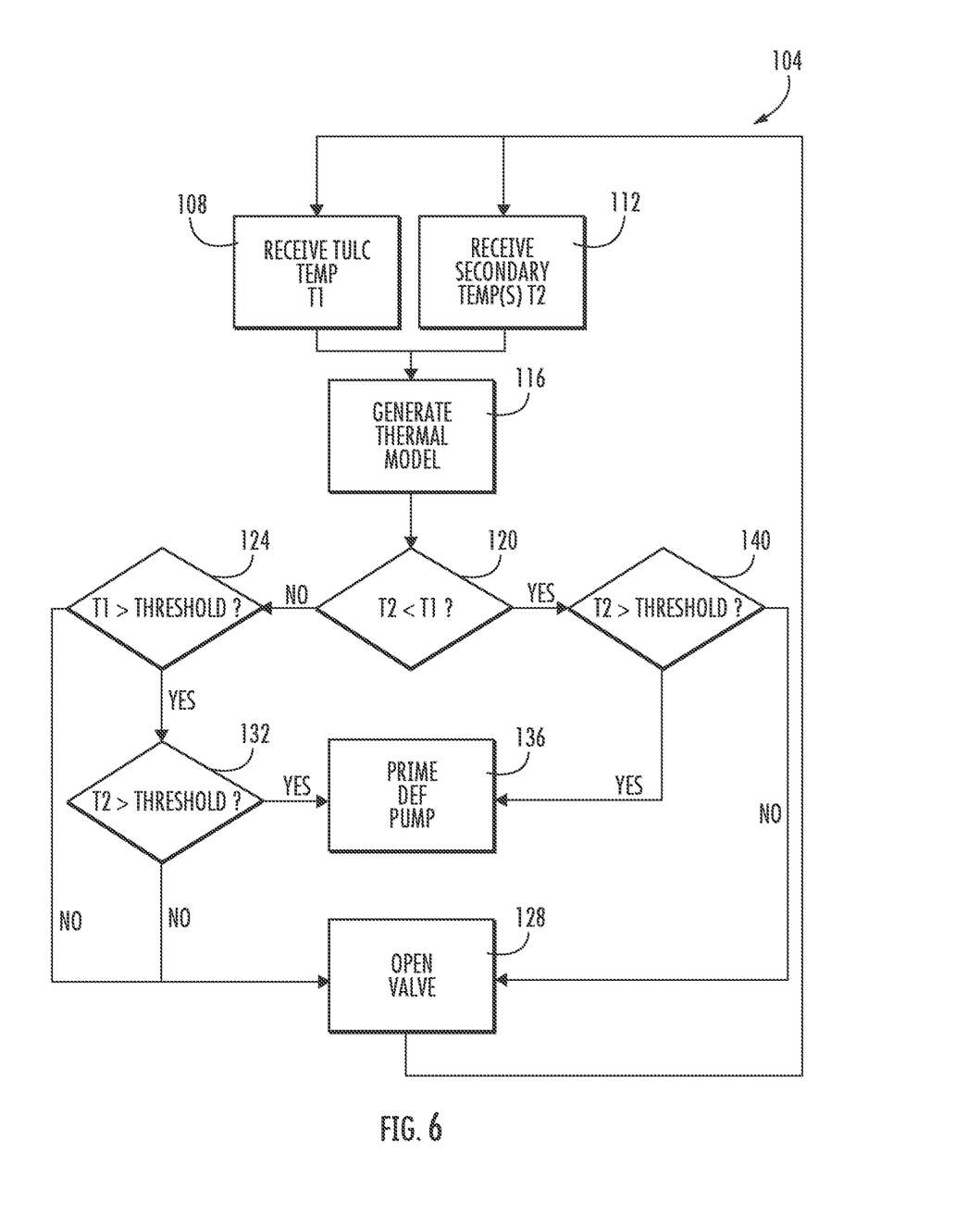
FIG. 6 is a flow diagram of a method for operating a DEF heating system according to some embodiments.
Figure 7A:
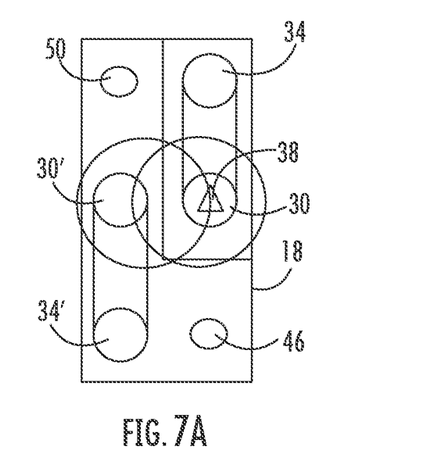
FIGS. 7A-D are schematic diagrams of a DEF heating system according to some embodiments.
Figure 7B:
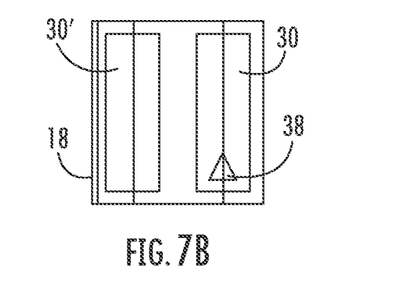
Figure 7C:
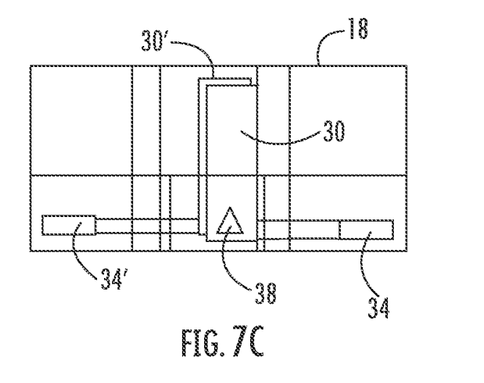
Figure 7D:
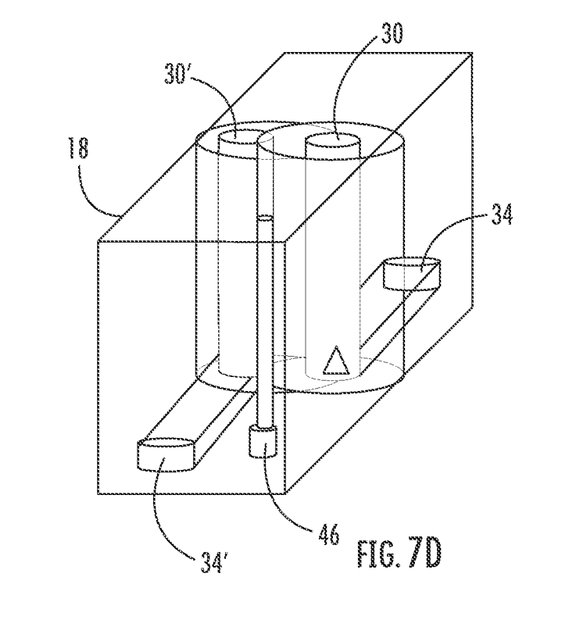
Figure 8A:
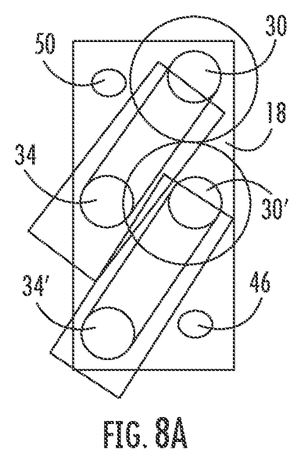
FIGS. 8A-D are schematic diagrams of a DEF heating system according to some embodiments.
Figure 8B:
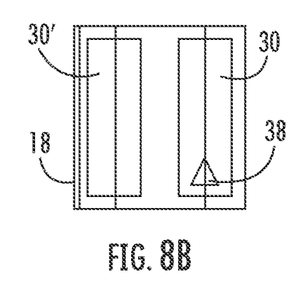
Figure 8C:
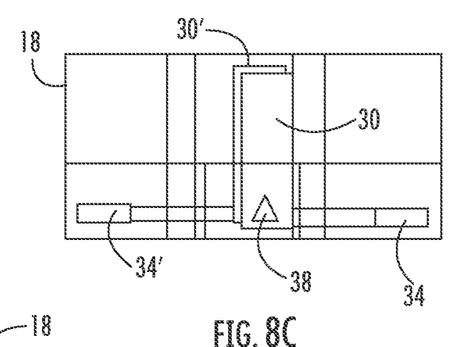
Figure 8D:
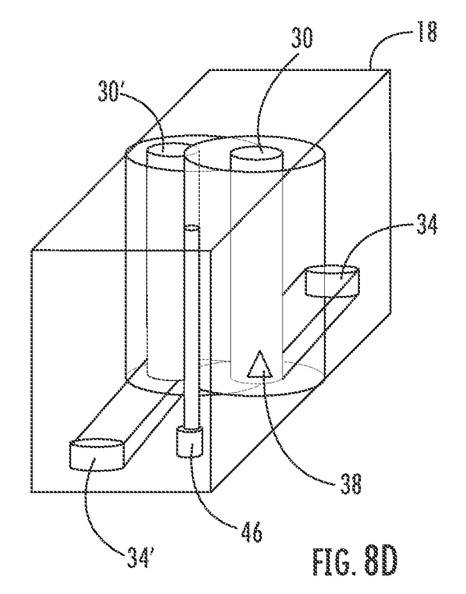

As shown in FIG. 6, a method 104 of operating the DEF heating system 10 includes receiving the primary temperature T1 at step 108 from the TULC sensor 38 and receiving the secondary temperature T2 at step 112 from the secondary sensor array 42. The controller 66 then generates the thermal model at step 116. In some embodiments, the thermal model generated at step 116 is used directly (e.g., via a three-dimensional heat map) to determine parameters of the DEF (e.g., a percentage and distribution of melted DEF, a volume of melted DEF, a temperature distribution, etc.) and the thermal model is used directly to determine operation of the electronically controlled coolant valve 22.

As shown in FIG. 6, the controller 66 compares the primary temperature and the second temperature at step 120.

If the primary temperature T1 is less than or equal to the secondary temperature T2 then the method 104 proceeds to step 124 and the primary temperature T1 is compared to the threshold temperature (e.g., 15° C.). If the primary temperature T1 is less than (or equal to) the threshold temperature, a diesel exhaust fluid (DEF) pump cannot yet be primed and the DEF tank 18 must be thawed. At step 128, the electronically controlled coolant valve 22 is opened to heat the DEF within the DEF tank 18, and the method returns to steps 108 and 112. If the primary temperature T1 is greater than (or equal to) the threshold temperature at step 124, then the method 104 proceeds to step 132 and the controller 66 compares the secondary temperature T2 to the threshold temperature. If the secondary temperature T2 is greater than (or equal to) the threshold temperature, then the DEF pump is primed at step 136. If the secondary temperature T2 is less than (or equal to) the threshold temperature at step 132, then the electronically controlled coolant valve 22 is opened and the DEF is further heated. In some embodiments, the step 132 is eliminated.

If the secondary temperature T2 is less than the primary temperature T1 at step 120, then the method 104 proceeds to step 140 and the secondary temperature T2 is compared to the threshold temperature. The electronically controlled coolant valve 22 is opened at step 128 if the secondary temperature T2 is less than (or equal to) the threshold temperature, and the DEF pump is primed at step 136 if the secondary temperature T2 is greater than (or equal to) the threshold temperature.

The systems and methods described above advantageously provide an improved control of DEF thawing and heating within large DEF tanks. For example, this can be especially important in DEF tanks 18 larger than 30 gallons and cool spots tend to exist where existing systems misrepresent the temperature of DEF throughout the DEF tank 18.

As shown in FIGS. 7A-D, a DEF tank 18 that includes a first heating unit 30 and a second heating unit 30' can be arranged in opposing directions with secondary sensor 46 and 50 arranged spaced apart from the heat exchangers 34 and 34'. The location of the TULC 38 is generally central within the DEF tank 18 to reduce the effects of sloshing of DEF within the DEF tank 18. However, the central location of the TULC 38 can lead to an inaccurate assessment of the state of DEF within the DEF tank 18 without the addition of the secondary sensor array 42 including the secondary sensors 46 and 50. FIGS. 8A-D show another embodiment of a DEF tank 18 including two heating units 30 and 30' arranged generally in parallel facing the same direction. In some embodiments, the DEF tank arrangements shown in FIGS. 7A-D and 8A-D may include only one secondary sensor 46 or more than two secondary sensors. The heat exchangers 34, 34' are positioned in separate portions of the DEF tank 18 in order to provide heating to separate areas, volumes, or portions of the DEF tank 18 to more evenly thaw DEF within the DEF tank 18. The separate portions of the DEF tank 18 do not overlap. The heat exchangers 34, 34' are arranged in the separate portions in a non-overlapping fashion. In some embodiments, a first heating element including the heat exchanger 34 is positioned in a first portion of the diesel exhaust fluid tank 18, and a second heating element including the heat exchanger 34' is positioned in a second portion of the diesel exhaust fluid tank 18 that does not overlap with the first portion.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using one or more separate intervening members, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic. For example, circuit A communicably "coupled" to circuit B may signify that the circuit A communicates directly with circuit B (i.e., no intermediary) or communicates indirectly with circuit B (e.g., through one or more intermediaries).

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

While various circuits with particular functionality are shown in FIG. 5, it should be understood that the controller 66 may include any number of circuits for completing the functions described herein. For example, the activities and functionalities of the sensor circuit 84, the ECM circuit 88, the modelling engine 92, and the heating circuit 96 may be combined in multiple circuits or as a single circuit. Additional circuits with additional functionality may also be included. Further, the controller 66 may further control other activity beyond the scope of the present disclosure.

As mentioned above and in one configuration, the "circuits" may be implemented in machine-readable medium for execution by various types of processors, such as the processor 74 of FIG. 5. An identified circuit of executable code may, for instance, comprise one or more physical or logical blocks of computer instructions, which may, for instance, be organized as an object, procedure, or function. Nevertheless, the executables of an identified circuit need not be physically located together, but may comprise disparate instructions stored in different locations which, when joined logically together, comprise the circuit and achieve the stated purpose for the circuit. Indeed, a circuit of computer readable program code may be a single instruction, or many instructions, and may even be distributed over several different code segments, among different programs, and across several memory devices. Similarly, operational data may be identified and illustrated herein within circuits, and may be embodied in any suitable form and organized within any suitable type of data structure. The operational data may be collected as a single data set, or may be distributed over different locations including over different storage devices, and may exist, at least partially, merely as electronic signals on a system or network.

While the term "processor" is briefly defined above, the term "processor" and "processing circuit" are meant to be broadly interpreted. In this regard and as mentioned above, the "processor" may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the DEF heating system 10 as shown in the various exemplary embodiments is illustrative only. Additionally, any element disclosed in one embodiment may be incorporated or utilized with any other embodiment disclosed herein. For example, the controller 66 of the exemplary embodiment may be incorporated in the ECM 62 of the exemplary embodiment. Although only one example of an element from one embodiment that can be incorporated or utilized in another embodiment has been described above, it should be appreciated that other elements of the various embodiments may be incorporated or utilized with any of the other embodiments disclosed herein.

What is claimed is:

1. A diesel exhaust fluid system, comprising:
    a diesel exhaust fluid tank;
    a first temperature sensor positioned within the diesel exhaust fluid tank and structured to provide first temperature information indicative of a first temperature;
    a second temperature sensor positioned within the diesel exhaust fluid tank and structured to provide second temperature information indicative of a second temperature; and
    one or more processing circuits comprising one or more memory devices coupled to one or more processors, the one or more memory devices configured to store instructions thereon that, when executed by the one or more processors, cause the one or more processors to:
        generate a three-dimensional heat map based on the first temperature information and the second temperature information; and
        provide energy to a heating system based on the three-dimensional heat map.

2. The diesel exhaust fluid system of claim 1, wherein the one or more processing circuits further comprise an engine control module structured to receive the first temperature information.

3. The diesel exhaust fluid system of claim 1, wherein the one or more memory devices are further configured to store instructions thereon that, when executed by the one or more processors, cause the one or more processors to:
    generate a thermal model of the diesel exhaust fluid tank including the three-dimensional heat map, and
    wherein energy is provided to the heating system when the thermal model indicates that diesel exhaust fluid within the diesel exhaust fluid tank is less than or equal to a predetermined threshold.

4. The diesel exhaust fluid system of claim 1, wherein the one or more memory devices are further configured to store instructions thereon that, when executed by the one or more processors, cause the one or more processors to:
    provide energy to a heating element when (i) the first temperature is less than or equal to a predetermined threshold and the second temperature is within a predetermined range from the first temperature, or (ii) the second temperature is less than or equal to the predetermined threshold and the second temperature is not within the predetermined range from the first temperature.

5. The diesel exhaust fluid system of claim 1, wherein the diesel exhaust fluid tank is equal to or larger than 30 gallons.

6. The diesel exhaust fluid system of claim 1, further comprising an exhaust fluid tank header,
    wherein the exhaust fluid tank header supports each of the heating system, the first temperature sensor, and the second temperature sensor.

7. The diesel exhaust fluid system of claim 1, further comprising a sensor suite including a level sensor, a quality sensor, and the first temperature sensor.

8. The diesel exhaust fluid system of claim 7, further comprising:
    a third temperature sensor positioned within the diesel exhaust fluid tank and structured to provide third temperature information indicative of a third temperature;
    a fourth temperature sensor positioned within the diesel exhaust fluid tank and structured to provide fourth temperature information indicative of a fourth temperature; and
    a fifth temperature sensor positioned within the diesel exhaust fluid tank and structured to provide fifth temperature information indicative of a fifth temperature.

9. The diesel exhaust fluid system of claim 8, wherein the one or more processing circuits further comprise an engine control module structured to receive the first temperature information from the combination sensor, and
    wherein the one or more memory devices are further configured to store instructions thereon that, when executed by the one or more processors, cause the one or more processors to:
        receive the first temperature information from the engine control module;
        receive the second temperature information from the second temperature sensor;
        receive the third temperature information from the third temperature sensor;
        receive the fourth temperature information from the fourth temperature sensor;
        receive the fifth temperature information from the fifth temperature sensor; and
        generate a thermal model of the diesel exhaust fluid tank including the three-dimensional heat map based on the first temperature information, the second temperature information, the third temperature information, the fourth temperature information, and the fifth temperature information.

10. The diesel exhaust fluid system of claim 1, further comprising the heating system,
    wherein the heating system includes a heating element.

11. The diesel exhaust fluid system of claim 10, wherein the heating element includes a heat exchanger structured to receive coolant from an engine.

12. The diesel exhaust fluid system of claim 1, further comprising the heating system,
    wherein the heating system includes
        a first heating element positioned in a first portion of the diesel exhaust fluid tank, and
        a second heating element positioned in a second portion of the diesel exhaust fluid tank that does not overlap with the first portion.

13. The diesel exhaust fluid system of claim 1, wherein the one or more memory devices are further configured to store instructions thereon that, when executed by the one or more processors, cause the one or more processors to:
    compare the first temperature to the second temperature;
    compare the first temperature to a predetermined threshold;
    compare the second temperature to the predetermined threshold; and
    provide energy to the heating system when:

the first temperature is less than or equal to the second temperature, and the first temperature is less than or equal to the predetermined threshold, or the second temperature is less than or equal to the predetermined threshold.

14. The diesel exhaust fluid system of claim 13, wherein the one or more memory devices are further configured to store instructions thereon that, when executed by the one or more processors, cause the one or more processors to:

send a signal allowing operation of a diesel exhaust fluid pump if the second temperature is less than the predetermined threshold.

15. A diesel exhaust fluid tank control system for use with a diesel exhaust fluid tank including a temperature ultrasonic level and concentration (TULC) sensor and a heating system, the diesel exhaust fluid tank control system comprising:

a temperature sensor array positioned within the diesel exhaust fluid tank and structured to provide temperature information; and one or more processing circuits comprising one or more memory devices coupled to one or more processors, the one or more memory devices configured to store instructions thereon that, when executed by the one or more processors, cause the one or more processors to:
 provide energy to the heating system based on the temperature information;
 receive TULC temperature information from the TULC sensor, the TULC temperature information indicative of a TULC temperature;
 determine a secondary temperature based on the temperature information received from the temperature sensor array;
 compare the TULC temperature to the secondary temperature;
 compare the TULC temperature to a predetermined threshold;
 compare the secondary temperature to the predetermined threshold; and
 provide energy to the heating system when:
  the TULC temperature is less than or equal to the secondary temperature, and the TULC temperature is less than or equal to the predetermined threshold, or
  the secondary temperature is less than or equal to the predetermined threshold.

16. The diesel exhaust fluid tank control system of claim 15, wherein the one or more memory devices are further configured to store instructions thereon that, when executed by the one or more processors, cause the one or more processors to:

send a signal allowing operation of a diesel exhaust fluid pump if the secondary temperature is greater than a predetermined threshold.

17. A method comprising:

receiving primary temperature information indicative of a primary temperature from a first temperature sensor positioned within a diesel exhaust fluid tank;

receiving secondary temperature information indicative of a secondary temperature from a temperature sensor array positioned within the diesel exhaust fluid tank;

generate a three-dimensional heat map based on the first temperature information and the second temperature information; and provide energy to a heating system based on the three-dimensional heat map.

18. The method of claim 17, further comprising:

comparing the primary temperature to the secondary temperature;

comparing the primary temperature to a predetermined threshold;

comparing the secondary temperature to the predetermined threshold; and providing energy to the heating system when:
 the primary temperature is less than or equal to the secondary temperature, and the primary temperature is less than or equal to the predetermined threshold, or
 the secondary temperature is less than or equal to the predetermined threshold.

* * * * *